Jan. 19, 1971 E. A. HILLIARD, JR 3,556,892
METHOD OF MANUFACTURE OF CONVEYOR BELT
Filed Dec. 18, 1967 6 Sheets-Sheet 1

INVENTOR.
EVERETT A. HILLIARD, JR.
BY
Kenway, Jenney & Hildreth
ATTORNEYS

INVENTOR.
EVERETT A. HILLIARD, JR.

BY

ATTORNEYS

Jan. 19, 1971  E. A. HILLIARD, JR  3,556,892
METHOD OF MANUFACTURE OF CONVEYOR BELT
Filed Dec. 18, 1967  6 Sheets-Sheet 5

INVENTOR.
EVERETT A. HILLIARD, JR.
BY
*Kenway, Jenney & Hildreth*
ATTORNEYS

Jan. 19, 1971  E. A. HILLIARD, JR  3,556,892
METHOD OF MANUFACTURE OF CONVEYOR BELT
Filed Dec. 18, 1967  6 Sheets-Sheet 6

INVENTOR.
EVERETT A. HILLIARD, JR.
BY
Kenway, Jenney & Hildreth
ATTORNEYS

# United States Patent Office 3,556,892
Patented Jan. 19, 1971

3,556,892
METHOD OF MANUFACTURE OF CONVEYOR BELT
Everett A. Hilliard, Jr., Danvers, Mass., assignor to American Biltrite Rubber Co., Inc., Chelsea, Mass., a corporation of Delaware
Filed Dec. 18, 1967, Ser. No. 691,479
Int. Cl. B32b *31/08*
U.S. Cl. 156—164  11 Claims

ABSTRACT OF THE DISCLOSURE

The invention is a continuous method for manufacturing long lengths of belting, and the product thereof. The steps consist of assembling in front of a continuous curing or vulcanizing press the several plies and strength elements that go into the making of the belting. The plies are brought together under a pair of pressure rollers just before entering the nip of the curing press, and during passage through the press they are then bonded together and cured, the bond being primarily chemical. Additional steps of preparing the edges so as to have a predetermined configuration in the finished belt are also included, as well as suitable steps of tensioning and aligning the respective component layers and elements prior to bonding and curing.

BACKGROUND OF INVENTION

Conventional conveyor belting is manufactured by combining alternating layers of elastomeric material and textile material and bonding together the layers. That is, a conveyor belt consists of tension or strength members suitable for sustaining the weight of material being carried in the service required, these tension members being usually impregnated with an elastomeric material to develop good bonding and flex life. These tension members are encapsuled in other elastomeric materials of varying thicknesses whose purpose is to protect them from degradations due to wear, stress, impact, chemicals, moisture, and the like.

As is known in the art, tension members normally consist of three-dimensional textile bodies employing a variety of filamentary materials such as cotton, nylon, rayon, polyester, glass, and steel, these filaments being combined by traditional textile weaving methods into sheet materials such as plain fabrics, basket weave, solids woven fabrics, multi-warp fabrics, leno fabrics, and the like. The conveyor belt tension members are layers of such materials combined to produce the necessary strength to perform the load bearing service required of the entire belt.

Traditional approaches toward manufacturing conveyor belting have consisted of non-continuous steps of impregnating individual layers of fabric tension members with rubber, laminating them together with rubber layers in between, adding other rubber layers for covers, and curing the assembled product within a heated press, either the platen type or rotary type. The impregnation is generally done separately for each layer of fabric, and the bond between the fabric and the rubber is primarily a mechanical one, the rubber being forced mechanically into the fabric interstices.

The conventional way of putting together a composite belt is first to place on an assembly bench a first cover layer of, for example, rubber-covered fabric. Then on this cover layer are placed successive plies or layers of frictioned fabric, or frictioned and skimmed fabric, or fabric frictioned on one side only, or fabrics that are skimmed with heavy covers on one side, or any other useful layer of elastomer and tensile strength member or combination thereof. Finally, on top of these layers assembled on the assembly table is placed a top cover of, for example, uncured rubber. Thereafter, the entire laid-up assembly is bodily lifted and moved to the entrance side of either a continuous curing press (such as, for example, the kind that employs a large rotating drum in conjunction with heating means and press means) or a platen-type curing press. The laid-up assembly is fed into the press, and the several plies are bonded therein while being cured.

Among the several difficulties and objections to this process may be mentioned that it is extremely difficult to obtain a uniform and individual control of the tension of the tension members going into the composite belt, with the result that not all layers of the belt have the same tension thereon when the belt is under load. This leads to short life under some circumstances, or to the necessity of using a belting which must be constructed stronger than need be. Also, the size of the lay-up that can be put through the curing press at one time is determined to a great extent by the capacity of the hoist used to lift the lay-up from the lay-up assembly table to the curing press. Also, the mere handling of long lengths of laid up fabrics and rubbers is difficult at best, particularly if one wishes to avoid contamination from dirt and other materials that may be present in the room in which the assembly is being made. Cuts are very apt to occur, and also contamination by other elastomers. The fabrics of the interlayers may become distorted as well as that of the cover, and if cement is used in the lay-up, this introduces the opportunity for trapped solvent and resultant blistering and a weakened bond between the belt components. In addition, long lengths of belting are obtainable only by splicing short lengths together.

SUMMARY

It is the purpose of this invention to provide a new and unique method of producing long lengths of belting by combining the component assembly and curing in what is basically one continuous step, and further, it is an object of the invention to provide a unique design and construction suitable for conveyor belting which is produced by a continuous curing operation. The invention provides methods of suitably tensioning each member or ply of the belting.

Therefore, among the several objects and advantages of the invention may be noted the provision of a continuous method of making conveyor belting, starting with the individual components thereof; the provision of a method of the above class in which vulcanizing and bonding take place on leading portions of the belt components while trailing portions of the component lengths are being introduced to the curing press on a continuous basis; the provision of a method of manufacturing conveyor belts in which suitable and adjustable tensioning controls may be provided for the individual component layers, thus leading to a more uniform, final belting, and one that performs more uniformly when under load; the provision of any of the above methods with which there is combined step of forming the edge of the finished belt to a predetermined configuration on a continuous basis; the provision of a method for making belting on a continuous basis in which continuous lengths of metal wires may be embedded in the material of the bedding to act as strength members; the provision of a method of combining discrete layers of elastomeric and artificial and/or synthetic fabric tension members, whereby a chemical bond is created between the elastomer and the tension members during the curing and bonding process; the provision of a method of the last named kind in which the provision of the chemical bond and the curing are done on a continuous basis; the provision of a continuous method of making conveyor belting in which for a given size of handling machinery, larger quantities of the elements going into the belting may be assembled in front of a continuous curing press that hitherto has been the case; a provision of a method by which a weftless belting may be made on a continuous basis, with the warp reinforcements being provided on a continuous basis during a curing operation and under an adjustable tension; the provision of any of the above methods in which filamentary reinforcements may be provided in a continuous belt in the continuous production of said belt along with fabric reinforcements; the provision of any of the above methods using chemical bonds in which the filaments of the reinforcing material are pretreated chemically in order to obtain a bond between such reinforcing materials and the elastomers constituting the remainder of the belt; the provision of methods of the last named class in which the elastomers themselves are treated with or without having the filamentary means treated, in order to obtain a chemical bond between the elastomers and the reinforcing elements; and the provision of beltings made by any of the above methods. Other objects and advantages will be in part apparent and in part pointed out hereinafter.

The invention accordingly comprises the elements and combinations of elements, arrangements of parts, features of construction, and steps and sequence of steps and features of operation of the methods, all of which will be exemplified in the structures of the article and in the methods hereinafter described, and the scope of the application of which will be indicated in the appended claims.

In the accompanying drawings, in which are illustrated several embodiments of the invention:

Throughout the drawings, similar reference characters indicate corresponding parts. In the drawings, dimensions of certain of the parts may been modified and/ or exaggerated for the purposes of clarity of illustration and understanding of the invention.

Figure 1:
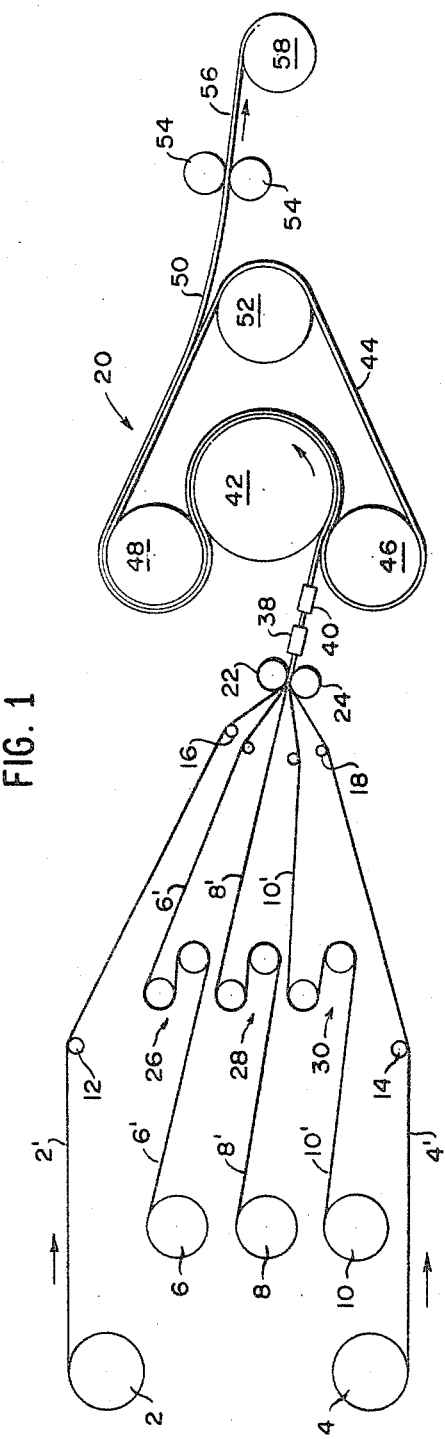
FIG. 1 is a schematic view in elevation of an assembly of apparatus units utilized for the practice of one embodiment of the invention.

Referring now to FIG. 1 for apparatus used in practicing a first embodiment of the invention, there are provided the rolls 2 and 4 of long lengths of the top cover material 2' and the bottom cover material 4'. As exemplary of the roll material, roll 2 may constitute a roll of a heavy gum rubber sheet 2' suitable for forming the load bearing layer on a belt. Roll 4 may constitute a roll of heavy gum sheet 4' suitable for forming the bottom or pulley layer of the belting. There are also provided rolls 6, 8 and 10 which are rolls of long lengths intermediate layers or plies 6', 8' and 10' of the finished belting. Layers 6', 8' and 10' constitute, for example, layers of preformed material, each layer comprising a frictioned textile with a skim layer on the bottom thereof (see FIG. 2).

Layers 2' and 4' are passed over the guide rolls 12 and 14 and thence to the further guide rolls 16 and 18 which are mounted in front of the continuous curing machine indicated generally by numeral 20. Layers 2' and 4' then pass between the pressure rolls 22 and 24.

Figure 1A:
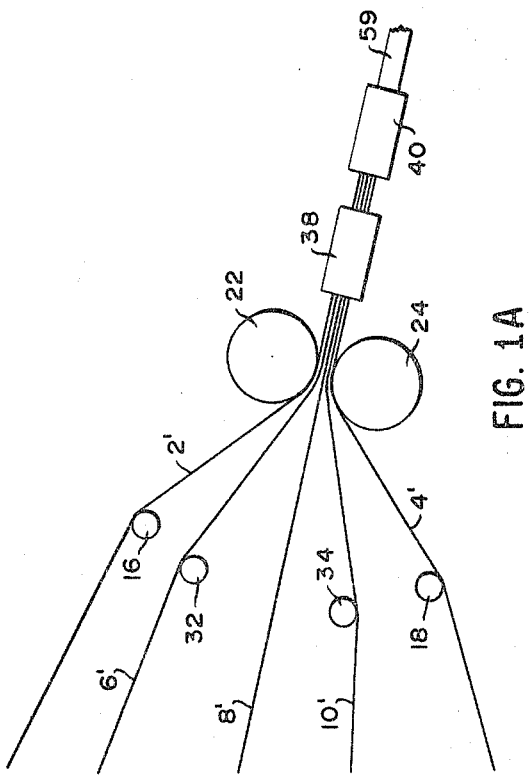
FIG. 1A is an enlarged view of a portion of FIG. 1, to show certain relationships in greater clarity.

The frictioned and skimmed reinforcing fabric materials 6', 8' and 10' first pass around the tension adjusting rolls indicated generally by numerals 26, 28 and 30, these sets of tension adjusting rolls being conventional. By means of these tension rolls, the tension in the intermediate plies 6', 8' and 10' may be adjusted. If desired, similar tension rolls (not shown) may be provided for the sheets 2' and 4'. From the tension rolls 26, 28 and 30, the materials 6' and 10' pass over the guide rolls 32 and 34 (see FIG. 1A) and then to the pressure rolls 22-24. Web 8' passes directly to the pressure rolls. As the materials 6', 8' and 10' pass between the pressure rolls 22 and 24, they lie between the two outer layers 2' and 4', as shown in FIG. 1A. The function of the pressure rolls 22 and 24 is to bring the components together firmly enough to prevent air from being entrapped between the layers, thus minimizing the later formation of blisters.

On emergence from the pressure rolls 22 and 24, the five layers of material pass through an edge trimming device indicated schematically by numeral 38, this edge trimming device being of conventional nature and well understood in the art, and being used to trim the edges of the materials 2'-10' to a desired width and to provide a relatively smooth edge on the uncured material. From the edge trimming device 38, the five layers of material then pass to a nylon tape edging device 40 of the kind shown in U.S. Patent 3,041,661, the teachings of which are incorporated herein by reference. The purpose of the edging device is to provide a rounded edge on the finished belting. (See FIG. 4.)

From the edge covering device 40, the material passes into the continuous curing or vulcanizing machine indicated generally by numeral 20, and which may be, for example, the Rotocure device shown in U.S. Patent 2,039,- 271, the teachings of which are incorporated herein by reference. Briefly, the curing machine 20 includes a large vulcanizing cylinder 42 suitably heated by steam or the like and mounted for free rotation about a horizontal axis. An endless flexible steel tension band 44 is looped about a substantial portion of the cylinder 42 and also about a pressure drum or roll 46 mounted tangent to the vulcanizing cylinder. Pressure drum 46 may also be heated, and thus there are provided two heated molding surfaces for the belting as it is introduced to the bight of the continuous vulcanizer.

As stated, the combined materials leaving the edge applier 40 are entered between the steel band 44 and the cylinder around the periphery of the latter and thence around the exit and driving drum 48, the bonding and curing taking place as it traverses this passage because of the heat of cylinder 42 and the pressure of band 44. The cured belting 50 is then stripped from the band 44 as shown, while the band passes around the tension adjusting drum 52. From the take-off point, the cured material passes through an edge tape removing device 54 schematically shown which may be of any conventional type for stripping the nylon edge banding 59 on a continuous basis from the edge of the completed belt. Or, if desired, the tape 59 may be removed by hand. From the tape removing apparatus 54, the finished belting 56 is then wound up on the take-up reel 58.

Figure 2:
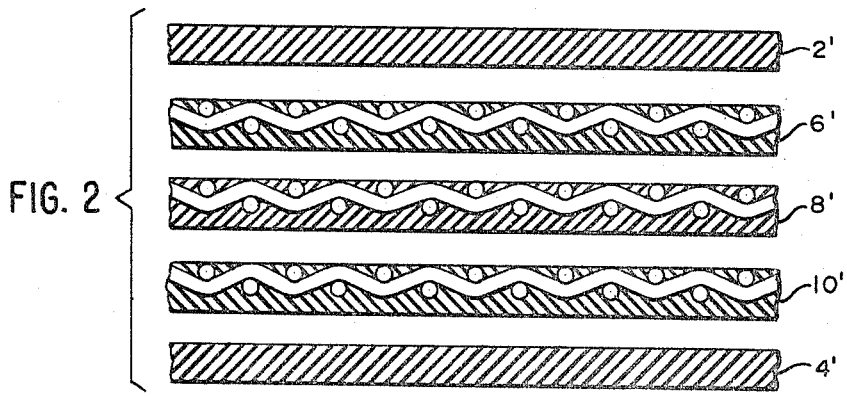
FIG. 2 is an exploded view in cross-section of a portion of one embodiment of a belt produced in accordance with the invention.
Figure 3:
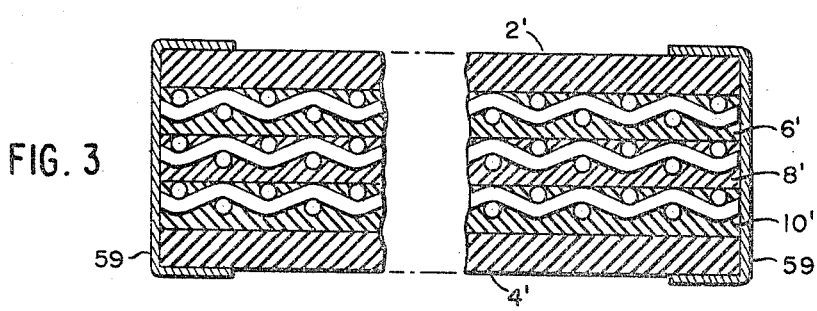
FIG. 3 is a cross-section of the belt of FIG. 2, shown in assembled form prior to entry in the curing and bonding press, and showing details of the edge portions.
Figure 4:
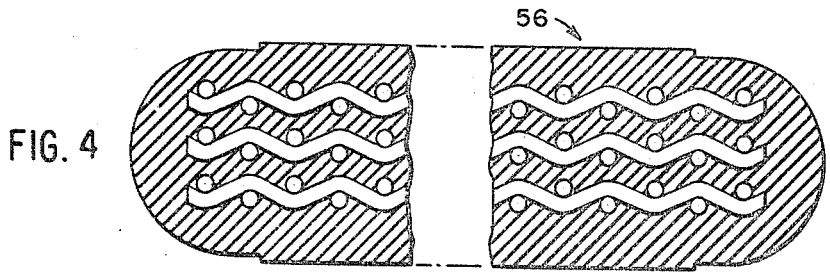
FIG. 4 is a cross-section of the FIGS. 2 and 3 embodiment of the invention, shown in its completed cured form.

The belting which has thus been described as being made using the apparatus shown in FIG. 1 is shown in three views FIGS. 2, 3 and 4. In FIG. 2, the layers 2'–10' are shown, the layer 2' and 4' being gum rubber, one acting as the belting cover and the other acting as the pulley surface of the belting, and the intermediate layers 6', 8', and 10 being any one of a number of kinds. In the view, the three layers 6', 8', and 10 are shown as each being a layer of textile fabric such as is usually used in reinforced belting, one surface of the textile fabric being a friction surface and the other side of the reinforcing member being a skim. These are exemplary only, since other plies (both cover and intermediate) may be used with equal facility.

In FIG. 3, the materials are shown as assembled and emerging from the tape applying appaartus 40 but still in the uncured state, the nylon edge-tape being indicated by numeral 59. Finally, in FIG. 4 there is illustrated a cross-section of an exemplary belt made by the method of this invention, showing the components vulcanized and bonded together and with the edges rounded in accordance with the practice of said United States patent 3,041,661, the nylon tape 59 having been removed.

Figure 5:
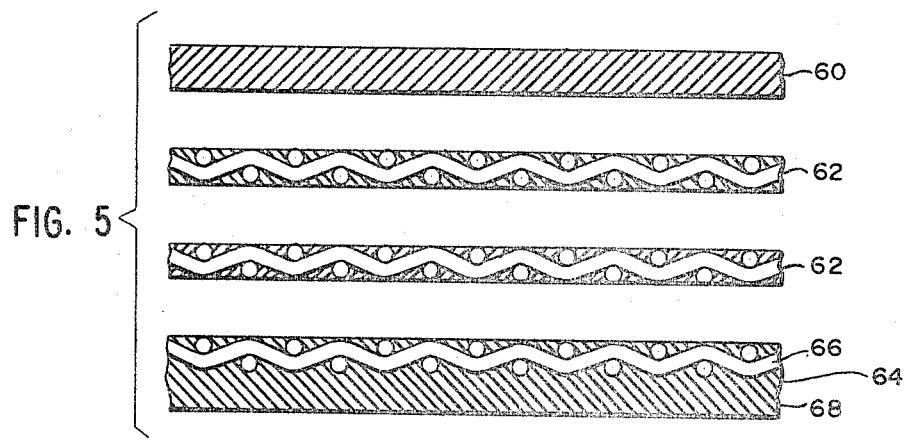
FIG. 5 is an exploded view in cross-section of a portion of a second embodiment somewhat similar to the FIGS. 1-4 embodiment, but showing another internal layer construction.

Referring now to FIG. 5, there is shown an exploded view of another exemplary belt which also may be made using the steps of the first embodiment. In this instance the belt consists of a cover 60 which is gum rubber, two intermediate layers 62 each of which consists of a friction fabric, and a pulley layer 64 which comprises a compound layer the top surface of which is a frictioned fabric 66 and the bottom portion of which is a gum rubber layer 68. Again, as in the embodiments just described, the material of layer 60 would be provided on reel 2, the material of layer 64 would be provided on reel 4, and the intermediate layers 62 would be provided on the reels 6 and 8 and their tension would be adjusted by means of the tension take-up devices 26 and 28. Again, as in the belting shown in FIG. 5, the several layers of the belt would pass over guide rolls of the kind indicated by numeral 16 and 18, through the nip rolls 22 and 24 to exclude air from between the belts, then through the edge trimming apparatus 38, the tape applying apparatus 40, and finally into the vulcanizing apparatus 20.

Figure 6:
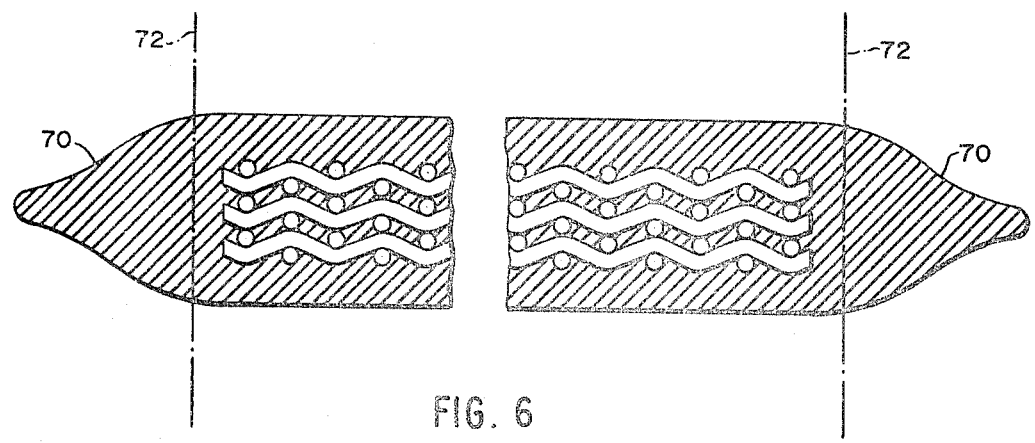
FIG. 6 is a view in cross-section of a third embodiment of the invention, shown in cured form but just prior to an edge-trimming operation.

Referring to FIG. 6, there is shown another embodiment of the kind of belt that may be made from the apparatus and method of the invention, but in this instance the edge wrapping apparatus 40 is omitted. Instead, the component layers pass through the vulcanizing apparatus, and as the cured belting leaves the band 44 on the exit side of the vulcanizer 20, the edges 70 of the belt will be found to be ragged and of uneven thickness, all of which is schematically illustrated in FIG. 6. At this point, then, instead of the tape removing apparatus 54, a trimming apparatus of conventional nature may be used which will trim the edges 70 along the dotted lines 72 as indicated in FIG. 6 in order to present a belt having a finished square edge. In the particular belt of FIG. 6, the assembly shown in FIG. 5 has been illustrated.

In the various assemblies of apparatus as shown in FIG. 1 (and also in FIGS. 7 and 8 described below), the individual units of the apparatus are not the invention herein. It is the method of making belting by the steps set forth above, and the new product thereof that are the invention herein.

Figure 7:
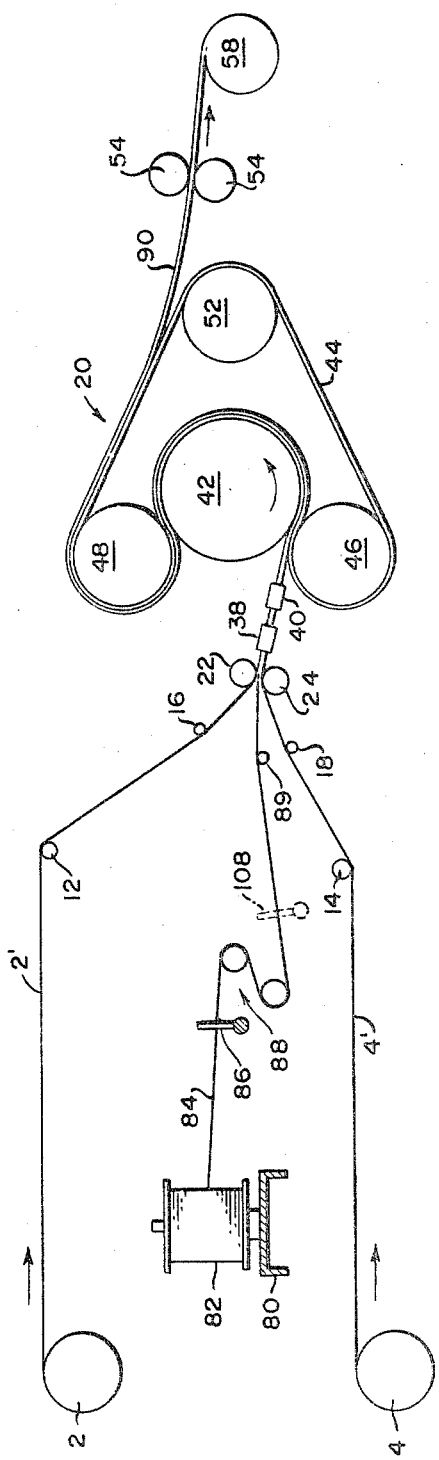
FIG. 7 is a schematic view in elevation of a second assembly of apparatus units for the practice of another embodiment of the invention.
Figure 8:
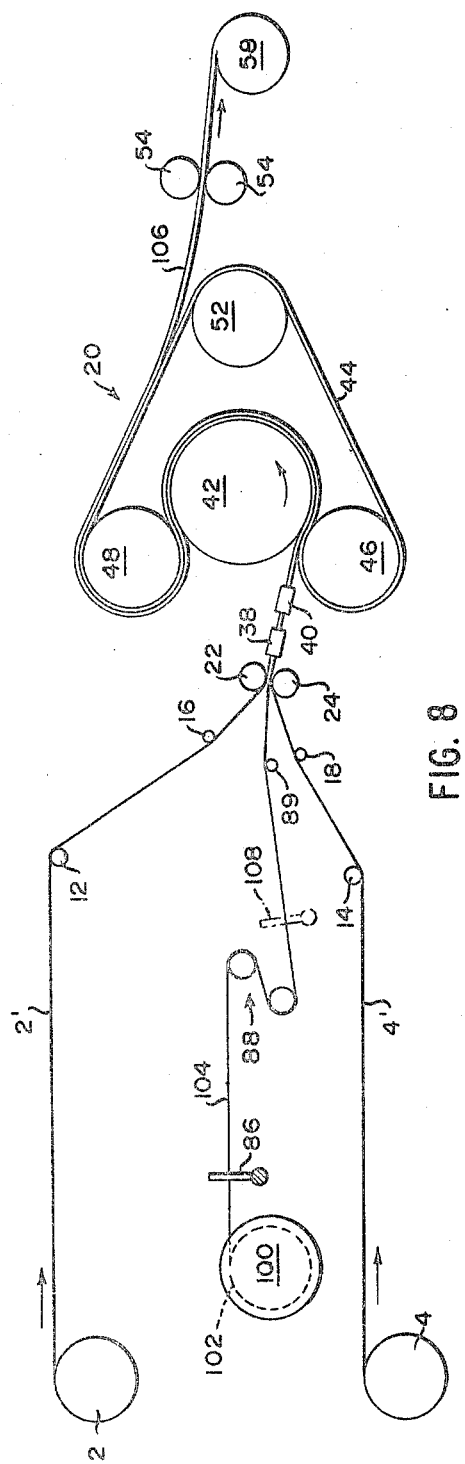
FIG. 8 is a schematic view in elevation of another assembly of apparatus, somewhat similar to that of FIG. 7, but constituting an alternative to the FIG. 7 embodiment.

Referring now to FIG. 7, there is shown schematically an array of components utilized in a method of making belting wherein the belting is composed, for example, of an elastomeric carcass reinforced by longitudinally extending reinforcing filaments. That is, a weftless belting. The resulting beltings made by the method using the apparatus of FIG. 7, and also by that using the apparatus of FIG. 8, are shown, as examples, in FIGS. 9, 10 and 11.

In this instance, the reels 2 and 4, as before, contain wound up long lengths 2' and 4' of elastomeric material such as rubber, and the lengths 2' and 4' are lead, as before, over the guide rolls 12 and 14, and 16 and 18, and thence to the pressure rolls 22 and 24, all as in the FIG. 1 embodiment. However, in this assembly of apparatus, instead of the rolls 6, 8 and 10 of reinforced fabric material, a creel 80 is provided on which are mounted in conventional manner a plurality of rotatable spools 82 on which are wound long lengths of steel cords 84 which become the longitudinal reinforcing elements of the finished belt. The steel cords 84 are collected from the spools 82 and lead through a comb 86 in order to space the cords horizontally and laterally in the desired manner. If desired, the teeth of comb 86 may be made adjustable, in order to space the cords laterally apart adjustably at the start of an operation, or during the operation of feeding the components to the curing press 20.

From the comb 86 the cords pass to a tensioning device 88 illustrated schematically and from 88 the horizontally extending band of steel cords passes preferably over the guide roll 89 and thence between the outer elastomeric cover sheets 2' and 4' and between the pressure rolls 22 and 24. Air is pressed out by rolls 22 and 24, and on emergence from the pressure rolls with the steel cords held between the webs 2' and 4', the assembly passes through the edge trimming device 38 described above, and thence to the edge wrapping mechanism 40. From 40, the composite assembly passes to the continuous vulcanizing apparatus indicated generally by numeral 20 and described above in connection with the FIG. 1 assembly. The layers 2' and 4' are cured and bonded together, and to the steel cords, during the passage through the vulcanizer 20. The tension of the steel cords is adjusted, during the continuous operation of manufacture, by means of a tension adjusting apparatus 88. If desired, both in this assembly and in the FIG. 1 assembly, suitable tensioning apparatus can be applied to the webs 2' and 4', but in general this will not be found to be necessary. It will be understood that there is a tension adjusting device 88 for each of the cords 84.

After vulcanizing on the vulcanizer 20, the finished belting 90 is stripped from the steel band 44 and passes through the mechanism 54 by which the tape edging is removed. From the stripper 54, the finished belting is wound up on the take-up reel 58.

Referring now to FIG. 8, an array similar to that shown in FIG. 7 is shown, but in this instance, instead of using a reel 80 and the plurality of spools 82 of steel cord, a beam 100 is used on which has previously been wrapped a plurality of windings 102 of reinforcing steel cord 104. From the windings 102 the steel cords 104 pass through a comb 86, as in the FIG. 7 method, and from the comb they pass to the tensioning device 88, over the guide roll 89 and thence between the pressure rolls 22 and 24 between which also has been passed, as in the FIG. 7 embodiment, the outer belting layers 2' and 4'.

As in the FIG. 7 embodiment, the combination issues from the pressure rolls 22 and 24, thence to the edge trimming mechanism 38, the edge tapping mechanism 40, and finally to the continuous vulcanizer 20. After vulcanization, the finished belt 106 is stripped from the belt, passed through the tape stripper mechanism 54 and is wound up on take-up reel 58.

As in the FIG. 7 embodiment, the comb 86 may be adjustable as to the spacing between the teeth of the comb, and as to their relative grouping.

Figure 9:
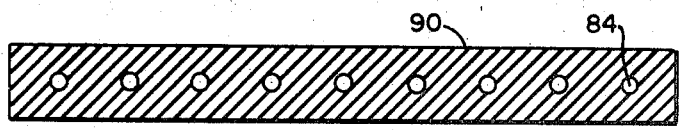
FIGS. 9-11 are schematic cross-sectional views of three possible embodiments of belting produced on either the FIG. 7 or 8 apparatus.
Figure 10:
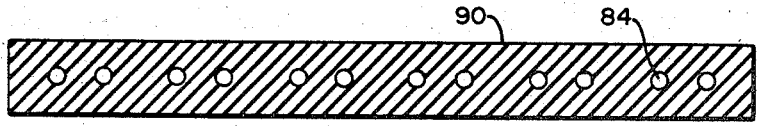
Figure 11:
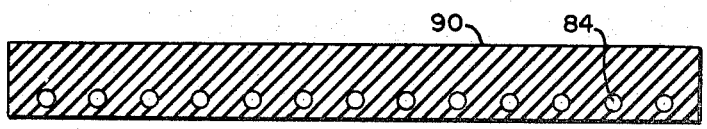

Referring now to FIGS. 9, 10 and 11, there are shown three examples, all in cross-section, of belting made using the process and methods of FIGS. 7 and 8, the thickness and other dimensions of the belting and the reinforcing elements being exaggerated in their relationships, for purposes of clarity. In view of the fact that the assemblies of FIGS. 7 and 8 are the same except for the initial source of the cords, this source being the individual spools 82 in FIG. 7 and the wound beam 100 in FIG. 8, the numerals applied to the elements of the belts of FIGS. 9, 10 and 11 will be those used in the FIG. 7 description. In FIG. 9, the cured carcass 90 is shown and, as described above, is made up of the vulcanized joined layers 2' and 4'. Centered within the cross-section of the belt carcass are the steel reinforcing cords 84. It will be observed that in this finished belt, the cords are equally spaced and are centered between the top and bottom of the belt.

In FIG. 10, the carcass 90 is shown again, but in this instance the cords are more numerous than in the FIG. 9 belt, and are grouped in pairs as shown, the grouping being done by adjustment of the aforesaid combs.

In FIG. 11, the carcass 90 is again shown, but in this instance the thicknesses of the components 2' and 4' is so arranged that in the finished belt the cords 84 are nearer to one side of the belt than the other.

The purpose of illustrating these three embodiments of finished belting is merely to show the possibilities or variation in the number of cords, the grouping, and the spacing of the cords from the two belt surfaces. Of course, using the apparatus shown in FIGS. 7 and 8, by adjusting the spacing of the comb 86 during the continuous operation, the cord spacing from edge to edge of the width of the belt can also be adjusted on a continuous basis. This is not possible with former methods of lay-up of belting.

In the views of FIGS. 7 and 8, each of the cords 86 and 104, respectively, pass over its own tensioning device 88, so that all cords may be adjusted to have the same tension. If desired, however, a single tension adjusting device may be used which adjusts the tensions of all the cords simultaneously. By using an individual tension device for each cord, then during the continuous production of the belt, the individual cords may each have applied to it its own tensioning in order to impart certain desired characteristics in the finished belt. For example, the two outer cords in the belt may have a higher tension than inner cords. Or, on the contrary, depending on where the bearing pulleys may be if the finished belt is to be a conveyor belt, the center cords may have a greater tension applied to them than the outer cords. Again, it would be extremely difficult to do this using the prior art methods.

Also shown, in dotted lines, in FIGS. 7 and 8, is an additional comb mechanism 108. This comb lies on the exit side of the tension adjusting mechanism 88 (both in the case where a single tension adjustment is made which all of the cords pass, or individual tensioning adjustments are provided) and the purpose of the additional comb 108 is to make sure that just prior to entering the pressure rolls 22 and 24, the reinforcing cords are with certainty brought into the relative spacing and grouping that is desired in the finished belt.

Thus, some of the advantages of this continuous process of the manufacture of belting over the traditional or prior art methods are the uniform and individual control of tensioning of the reinforcing elements, as well as the outer layers, the result being that the total carcass construction shares the impressed load equally between plies. Also, the product quality is improved by reducing the handling and transporting of the belt components, and, thereby, lessening the opportunity for introduction of faults such as cuts, contamination with other elastomers, distortions of fabric and covers, and elimination of the necessity of using cement in a belt building process. As is well known, the use of cement nearly always introduces the opportunity for trapped solvent and resultant blistering and weakened cured belt adhesions. In the present embodiment, no such solvent is used, since the entire belt is put together by feeding into the continuous vulcanizer the components thereof and the formation of the belting (that is, the bonding of the various plies and reinforcing elements together) is accomplished by vulcanization in the vulcanizer 20.

A further advantage is that the process lends itself, as described, to the production of a unique belt configuration consisting of weftless tension members in combination with elastomeric covers with or without additional carcass reinforcing members such as fabric layers, leno, and the like.

A further advantage of the invention is that it lends itself to the production of steel cord belting, and, in addition, may be used to produce belting having reinforcing members (cord or plies) of nylon, polyester and similar high unit strengths textile members in place of steel cords.

In regard to the belting produced on the assemblies of FIGS. 7 and 8, that is, belting such as examples shown in FIGS. 9, 10 and 11, it is not readily possible satisfactorily to trim to width such as a weftless steel cord carcass, the width of the carcass determining the number of ends per inch and the number of inches of width being fed to the press. Therefore, it will be found satisfactory if the width of this strength member, that is, the sheet of steel cords, is one inch less than the anticipated finished width of the belt. The additional one-half inch one each side of the carcass is gained by combining extra width cover and/or reinforcing materials such that they contact each other during the curing process through the vulcanizer 20 and fuse into a solid rubber edge.

As indicated above, while the description of the belting being produced is a description employing rubber as the elastomers 2' and 4', nevertheless the methods and apparatus of this invention are not limited to only such materials. A variety of high unit strength textile materials can be substituted for the steel cord material without materially altering the nature of the invention. Such alternate materials can include, but are not restricted to, the polyamides (nylon as an example), the polyesters (such as the Dacron), glass fibers in a continuous length form, regenerated celulose and the like. The elastomers 2' and 4' may have substiuted for them such materials as oriented nylon films, oriented polyester films, and the like.

In the descritpion on FIG. 1, the production of belting comprising the elastomeric outer layers and inner fabric layers having skim or friction surfaces was described. In the description of the embodiments of FIGS. 7 and 8, and thus the finished belts 9, 10 and 11, the construction shown was belting having elastomeric layers and a weftless construction. However, the longitudinal reinforcing steel or other material cord elemnts can be combined with the fabric reinforcing members shown in FIGS. 2–5, for example. Such constructions are shown in FIGS. 12–15.

Figure 12:
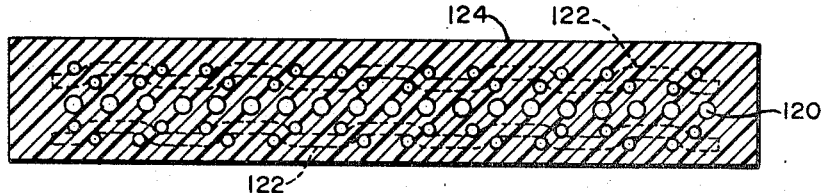
FIG. 12 is a cross-sectional view of an embodiment of the invention produced by combining certain elements and steps of the FIGS. 1 and 7-8 assemblies and methods.

In FIG. 12, there is shown a belting construction containing both fabric reinforcing components 122 and steel cords 120 like those of cords 84. Fabric 122 is bonded in the belting in the manner shown in the FIG. 1 assembly, method and product thereof. That is, the fabric 122 would come off reels 6 and 10, thus taking the place of the skim materials 6' and 10'. Since only two such fabrics are shown, the reel 8 and the fabric 8' would be omitted. Thus, in putting together an assembly of apparatus to build the FIG. 12 belting, the reel 8 would be removed, and substituted therefor would be either the reel 80 and spools 82 of FIG. 7, or the beam 100 and wrappings 102 of FIG. 8. If this is done, then the resulting products are lead into the pressure rolls 22–24 in a manner that is obvious in view of the above teaching. The fabric reinforcing elemnt 122 may be a leno type textile material composed of high strength filamentous yarn. The carcass member itself is indicated by numeral 124 and, as indicated above, may be an elastomer of a rubber-like nature, or may be nylon or a polyester and the like.

Figure 13:
FIGS. 13-15 are cross-sectional views of other embodiments of belting produced using the method and apparatus of the FIG. 1 embodiment.

In FIG. 13, a somewhat different construction is shown, in which the elastomer 126 is shown which may be of rubber, for example; or may be (instead of an elastomer)

a sheet of nylon or polyester and the like. In this instance, the reinforcing member is a continuous polymeric film 128 and if the elastomer 126 is of rubber, then the film itself may be a high strength nylon or Dacron film, or an oriented polyester, for example.

Figure 14:
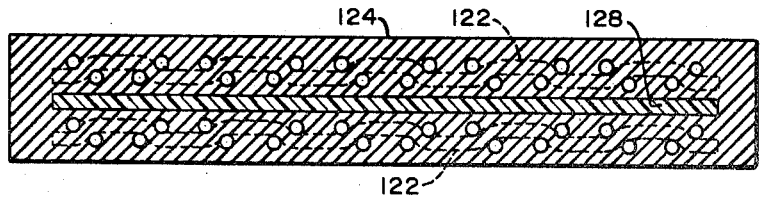

As shown in FIG. 14, instead of the cords 120 of FIG. 12, the film 128 may be combined with the reinforcing member 122, in an elastomer body 124, or a carcass of plastic resin of the types mentioned above.

In respect to the belting shown in FIGS. 12, 13, and 14, the purpose of using the woven reinforcing elements is to provide certain belt properties which are not developed in the manufacture of weftless (cored) belting. For example, there are provided those characteristics of longitudinal tear resistance, transverse stiffness, mechanical fastener, holding strength, improved impact resistance from dropped loads, and improved impact resistance from material trapped between the pulley surfaces and the pulley side of the conveyor belt.

Another advantage of the invention is that the elastomer layers of the finished belting may be positively bonded one to another by means of using an open weave fabric which allows "fingers" or "legs" of rubber to penetrate through the fabric layers and tie the layers of rubber together. In addition, the chemical treatment on the fabric sets up a chemical bond between the textile and the elastomer. The construction is therefore "unitized" as opposed to dissimilar layers of textile and rubber which in a conventional belt are "adhered" one to another, but where in each layer remains separate and distinct from the other layers.

Figure 15:
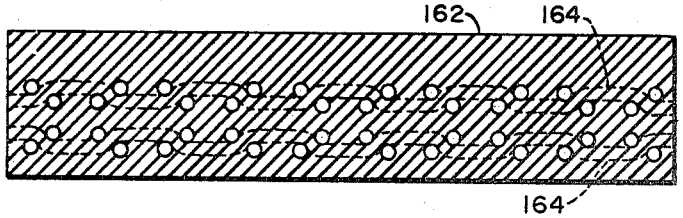

As an example of a belt built by the method of this invention, and as an example of specific materials that may be used in the belt, reference to FIG. 15 is made. The belt consists of two or more plies of open mesh, leno weave fabric, sandwiched between two outer layers of cover grade elastomer, with separating layers of elastomer between each ply. The elastomer layers are positively bonded one to another by means of the open weave fabric which allows fingers or legs of rubber to penetrate through the fabric layers and tie the layers of rubber together. In addition, the chemical treatment on the fabric sets up a chemical adhesion bond between the textile and the elastomer. The construction is therefore "unitized" as opposed to dissimilar layers of textile and rubber which in a conventional belting are adhered one to another, but, as indicated above, each layer remains basically separate and distinct from another layer.

In FIG. 15, the elastomer carcass of the belting is indicated by numeral 162, and the leno weave fabric is indicated by numeral 164. In the drawing, an elevation of a portion of a finished belt is presented, in which the belt is cut transversely between two weft threads of the fabric. Thus, as the shading indicates, there are legs or fingers of the top elastomer portions extending down to, and joining integrally with, the bottom portions of the elastomer layers.

As a result of this construction, special advantages will become apparent in the hot materials conveying applications. In such applications a major source of belting failure is ply delamination and separation of the belt components into distinguishable and original layers. The belt construction set forth in this invention obviate this tendency by means of the elastomer "legs" which are not degraded as severely as plied-up fabric components are. Since chlorobutyl elastomer represents a particularly good heat resistant material, a specific construction of such fabrics and a chlorobutyl elastomer is suggested for hot material applications. Thus, this would be a belting comprising two or more layers of polyester leno-type fabric (the polyester being, for example, Dacron) combined with layers of chlorobutyl elastomers.

This belt may be constructed of any suitable belting elastomer, such as SBR (styrene-butadiene rubber), natural rubber, chlorobutyl rubber, neoprene rubber, ethylene-propylene-terpolymer or the like, and the reinforcing fabric may be constructed of any suitable textile material such as nylon, rayon, polyester, or glass fabric. A specific product can be two or more plies of a nylon leno-type fabric, treated chemically in accordance with the description below, in combination or union with SBR elastomer compound.

In respect to this invention, it has been already indicated that one of the things that makes the invention possible is that chemical bonds may be relied upon to unite the elements going into the belting during the vulcanizing or curing process rather than just the mechanical bondings and adhesives previously used. In the instant case, chemical bonds are primarily relied upon, but these chemical bonds may also be utilized, if desired, in conjunction with mechanical bonds. As an example of this, the belting shown in cross section in FIG. 2 indicates outer layers 2' and 4' of an elastomer such as rubber. The inner reinforcing layers 6' 8' and 10' are frictioned or skimmed materials using a mechanical bond.

Once these reinforcing materials are thus made, then the unification of the components into the final belting is done as described on a continuous basis. In the curing operation either a chemical bond alone is relied upon, or depending upon the materials, no chemical bond is needed. For example, if the outer layers 2' and 4' are rubber, and the friction and skim surfaces are also rubber, then during vulcanization in vulcanizer 20, all of the interfaces vulcanize together. On the other hand, if the outer surfaces 2' and 4' are plastics, and the inner layers are a material such as a steel cord or a glass material, or if the outer layers are an elastomer such as rubber and the inner cords are a steel cord or a plastic reinforcing material, then a chemical bond is obtained during curing. The chemical bond is obtained by treating either the reinforcing materials with a resorcinol material with resultant chemical bonding during vulcanization; or by treating the elastomeric materials with resorcinol and not treating the inner reinforcing members. Again, with such practice, complete chemical bonding will take place during curing. Of course, if desired, resorcinol can be used both in the elastomers and as a coating for the inner reinforcing materials such as the steel cords 84.

As an example of treating the layers 2' and 4' with resorcinol and assuming that these layers are typical rubbers, a formula that may be used successfully is as follows:

| Ingredient: | Parts |
| --- | --- |
| Natural rubber | 100 |
| FEF black | 25 |
| Silicon dioxide | 15 |
| Zinc oxide | 3 |
| Stearic acid | 2 |
| Highly aromatic oil | 6 |
| PBNA | 1 |
| Sulfenamide accelerator | 1 |
| Sulfur | 2.5 |
| Resorcinol | 2.5 |
| Hexa | 1.6 |
| Hi Sil 233. | |

By PBNA is meant phenol beta naphthylamine. By hexa is meant hexamethylene tetramine. By Hi Sil 233 is meant a silicon dioxide manufactured and sold under said designation by Columbia Southern Company, a division of Pittsburgh Plate Glass Company. The above formula is broadly applicable to all materials that would be used as reinforcements, for example, steel, nylon, polyester, rayon.

The formula was tested for an adhesion, with the following results:

| Material to rubber | Lbs. adhesion | |
|---|---|---|
| | Normal rubber | Formula rubber |
| (1) Nylon 1″ strip | 4 | 85+ |
| (2) Rayon 1″ strip | 3.5 | 23+ |
| (3) Polyester | (1) | (1) |
| (4) Steel—2″ pull out tire cord | 41 | 70 |

¹ No data but equivalent to nylon if fabric washed in 2% PAPI.

In the above formula, by natural rubber is meant the same formula excluding the hexa, the silicon dioxide, and the resorcinol.

Where the synthetic reinforcing fabrics are to be treated by resorcinol to obtain the chemical bond, these synthetic fabrics being, for example, rayon, nylon or polyester, two methods may be used: In the first method the fabric is woven first, and is then treated and finished. In the second case, the individual yarns are first treated and are subsequently woven into the fabric. Thereafter no further finishing step is taken with the fabric.

In the treated fabric method, the system includes four steps: dip, dry, heat set, and stabilize. In the dip portion of the method, the fabric is immersed in a pad machine where it is impregnated with specific chemical solutions, commonly a resorcinol-formaldehyde latex variation. Soft surface squeeze rolls remove excess liquor, and return it to the mother solution, the squeezing driving the solution into the fabric, and bringing the fabric wet pick-up to a uniform content. Thereafter, the impregnated fabric is fed into a heated chamber, where it is dried. The chamber may be a simple oven, or a heated hood over a tenter frame, or the like. The heated chamber is usually in excess of 350° F. This step dries off the moisture from the impregnated fabric, leaving the solids of the solution as a residue on and in the fabric.

The final step in the fabric treating method is to heat-set and stabilize the coating. Incorporated with the drying step, but often the last section of the oven train, is a high heat zone whose purpose is partially to react the resorcinol-formaldehyde latex coating with the fabric in order to enhance adhesion, and to fix the physical dimensions of the fabric, that is, orientation thereof, at the elevated temperature. This produces fabric resistant or insensitive to the disturbing influences of subsequent process heat stages up to the level of this heat-setting temperature. In other words, with the heat-setting and stabilizing step, fabric shrinkage is minimized to provide dimensionally stable fabric for fabrication into products; and to maintain good mechanical properties of the fabric, such as high modulus, low elongation, and high tensile strength.

In order to accomplish this heat setting and stabilizing effect, the fabric is fed through the heating zone under the control of steel nip rolls or by wrapping the fabric around idler rolls, the let-off and take-up speeds of these control rolls being variable.

After the heat setting and stabilizing operation, the final step includes tentering the fabric to uniform width by feeding the fabric sheet between two rolls of constant speed edge gripping devices which grip the selvage edges of the fabric to carry the fabric along while at the same time pulling the fabric to a constant width. Of course, if desired, as is customary in the textile industry, stretcher rolls may be used for this purpose.

Figure 16:
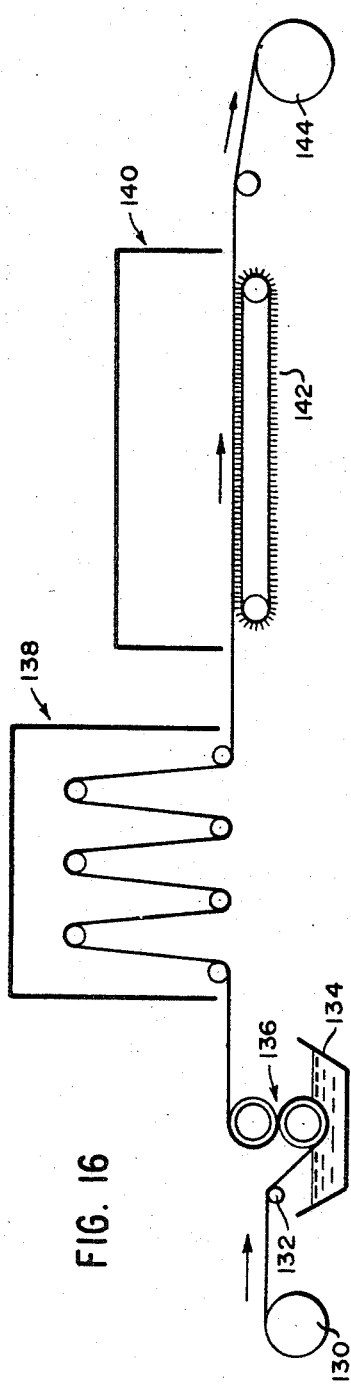
FIGS. 16 and 17 are schematic illustrations of apparatus used to coat filamentary material to enhance chemical bonding in the belting of this invention.

Shown in FIG. 16 is a schematic view of apparatus that may be used in the fabric treating method. A reel 130 is provided, on which is wound the fabric to be treated. The fabric feeds from reel 130 over the guide roller 132 and into the dipping or padding tank 134 from which it emerges between the squeeze-rolls 136. From the nip of these rolls, it passes into the hot air chamber indicated generally by 138 (passing in convolutions therethrough in customary manner; and from the hot air chamber it passes to the stabilizing chamber 140, again of conventional structure, the fabric also being tentered by the tentering machine 142 during this operation. From the high heat chamber 140 and the tentering machine 142, this finished fabric is wound up on the take-up reel 144.

In the treated yarn method, each yarn which goes into the assembly of the fabric is treated individually. However, several ends of yarn may be treated at the same time on this same machine.

Figure 17:
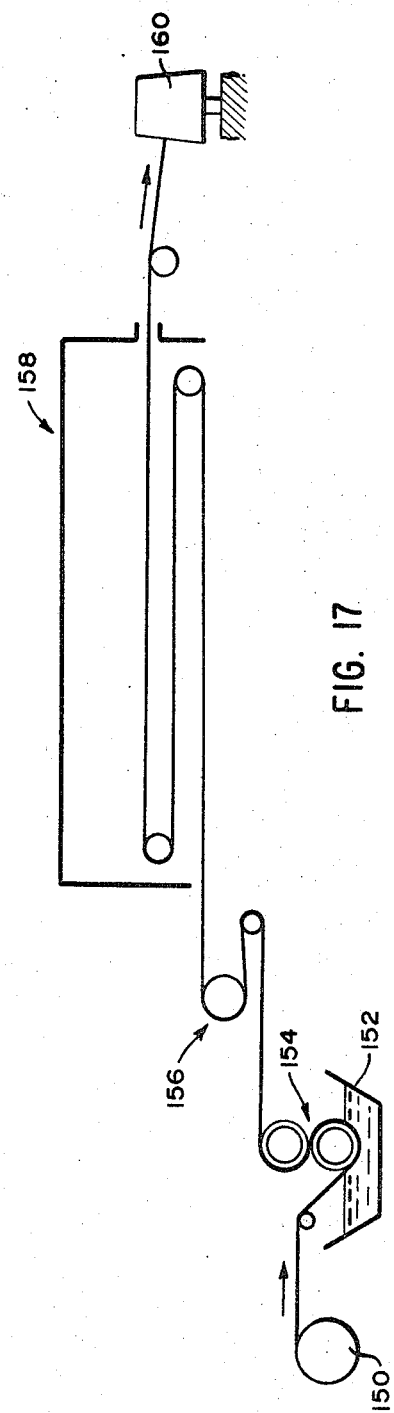

This operation includes the same steps as in handling fabrics, that is, the yarns are dipped, squeezed out, dried, heat set, tensioned, stabilized, and finally wound on reels. The machine scale is obviously much smaller than where fabrics are used, and more precise. Illustrated in FIG. 17 schematically is such an apparatus. Indicated by numeral 150 is a creel or beam of the yarns to be treated. These yarns are fed into a dipping or padding machine 152 and on emergence therefrom are fed through the squeeze rolls 154 and to a streatching and stabilizing machine 156. From the stabilizing machine the yarns pass into a drying and heat-setting oven 158, the yarn taking as many convolutions therein as is necessary to properly dry and heat set it, and on emergence from the heat stabilizing machine the yarn is individually wrapped on spools 160.

It will be understood that in describing in a schematic way the operations of FIGS. 16 and 17, these particular methods of treating either the fabric or the yarn are not part of this invention and are well known in the art.

In view of the above, it will be seen that the several objects of the invention are achieved, and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense and it is also intended that the appended claims shall cover all such equivalent variations as come within the true spirit and scope of the invention.

Having described the invention, what is claimed is:

1. A method of making multi-layered belts comprising the steps of:
  assembling lengths of prepared components for the belt before a continuous heat-curing press, the components comprising outer encapsulating layers of elastomeric material in an uncured state and tension members, the elastomeric material being adapted to be cured by heat;
  aligning the components;
  pressing the components together without preheating to a curing temperature in face to face relationship just prior to entry into the curing press, the pressing being done with sufficient force to eliminate air from between said components;
  tensioning at least some of said lengths prior to their entry into the curing press;
  curing and bonding the components in the press while simultaneously feeding into the press continuing lengths of the components, said continuing lengths being removed from a source thereof in a non-intermittent manner, and the step of tensioning also being carried out in a non-intermittent manner; and
  continuously curing the components while maintaining the tension, at a temperature sufficient to change the elastomeric material from its uncured state to a cured, elastic state.

2. The method of claim 1 in which the top and bottom layers of components are elastomers, and the intermediate layers are fabrics of natural fiber.

3. The method of claim 1 in which the top and bottom layers of components are elastomers, and at least one of the intermediate layers is a continuous sheet of synthetic polymeric resin, a chemical bond existing between the elastomers and said sheet.

4. The method of claim 1 in which at least the top and bottom layers of components are elastomers, and the intermediate layers are fabrics made of filaments selected from the group consisting of the high strength polyamides, the high strength polyesters, high strength regenerated cellulose and glass, the filaments of the fabric being coated with a resorcinol of the formaldehyde latex variation.

5. The method of claim 1 in which at least the top and bottom layers of components are elastomers containing resorcinol, and the intermediate layers are fabrics made of filaments selected from the group consisting of the high strength polyamides, the high strength polyesters, the high strength regenerated celluloses, and glass.

6. The method of claim 1 in which at least some of said components are metal wires, the wires having been surface coated with a resorcinol-formaldehyde latex variation.

7. The method of claim 1 in which at least some of the intermediate components are steel wires embedded in other components, said other components being elastomers containing resorcinol.

8. The method of claim 1 including a further step of imparting to the edges of the belt a predetermined configuration and structure.

9. The method of claim 8 in which said further step comprises causing the outer edge portions of the top and bottom elastomer components to bond one to the other during said curing, and then slitting the bonded portions on exit of the belt from said press.

10. The method of claim 8 in which said further step comprises leading to an edge of the belting as said components enter the press a fabric backing tape carrying a ribbon of uncured elastomeric material adhesively attached thereto, folding the ribbon and backing tape about said edge, securing the tape to the top and bottom faces of the outer components to hold the elastomeric material about said edge, curing the elastomeric material and simultaneously bonding it to said outer components, and thereafter stripping the tape from the cured belting.

11. The method of making composite belting on a continuous basis from a plurality of outer and internal plies comprising the steps of:
  providing a discrete supply of each of said plies;
  leading the plies from the supplies thereof to pressure-applying rolls;
  pressing the plies together between said rolls to exclude entrapped air and other vapors;
  adjusting the tension of at least some of the plies during passage thereof from the supply of the plies to said rolls; and
  bonding together and curing said plies on a continuous non-intermittent basis under conditions of heat and pressure so as to create at least a chemical bond between the interfaces of said plies and members.

References Cited

UNITED STATES PATENTS

| 2,432,544 | 12/1947 | Rhodes | 156—335U |
| 2,958,096 | 11/1960 | Hunt et al. | 264—347 |
| 3,041,661 | 7/1962 | Elliott | 264—284 |
| 3,242,118 | 3/1966 | St. Clair et al. | 156—335X |
| 3,345,229 | 10/1967 | Harpfer | 156—166 |

FOREIGN PATENTS

| 826,462 | 1/1938 | France | 156—137 |
| 247,450 | 10/1963 | Australia | 156—164 |

REUBEN EPSTEIN, Primary Examiner

U.S. Cl. X.R.

156—137, 269, 271